(12) United States Patent
Gururaj et al.

(10) Patent No.: US 9,372,770 B2
(45) Date of Patent: Jun. 21, 2016

(54) HARDWARE PLATFORM VALIDATION

(71) Applicants: Karthick Gururaj, Bangalore (IN);
Sandeep Pendharkar, Bangalore (IN);
Parag Naik, Bangalore (IN); Ragesh Thottathil Ramachandran, Ernakulam (IN); Deepanjan Kar, Bangalore (IN)

(72) Inventors: Karthick Gururaj, Bangalore (IN);
Sandeep Pendharkar, Bangalore (IN);
Parag Naik, Bangalore (IN); Ragesh Thottathil Ramachandran, Ernakulam (IN); Deepanjan Kar, Bangalore (IN)

( * ) Notice: Subject to any disclaimer, the term of this patent is extended or adjusted under 35 U.S.C. 154(b) by 224 days.

(21) Appl. No.: 13/909,426

(22) Filed: Jun. 4, 2013

(65) Prior Publication Data
US 2013/0326275 A1 Dec. 5, 2013

(30) Foreign Application Priority Data
Jun. 4, 2012 (IN) .......................... 2222/CHE/2012

(51) Int. Cl.
*G06F 11/263* (2006.01)
(52) U.S. Cl.
CPC .......... *G06F 11/263* (2013.01); *G06F 11/2635* (2013.01)
(58) Field of Classification Search
CPC ............ G06F 11/3684; G06F 11/3688; G06F 11/263; G06F 11/2635; G06F 8/76
See application file for complete search history.

(56) References Cited

U.S. PATENT DOCUMENTS

| 6,006,028 | A  | * | 12/1999 | Aharon ............... G06F 11/3684 703/21 |
| 6,715,108 | B1 | * | 3/2004  | Badger ................. G06F 11/263 707/999.202 |
| 6,789,216 | B2 | * | 9/2004  | Zagorski et al. ........... 714/38.11 |
| 7,861,119 | B1 | * | 12/2010 | Righi et al. .................. 714/38.1 |
| 8,683,282 | B2 | * | 3/2014  | Katz ..................... G06F 11/261 714/741 |
| 8,930,758 | B2 | * | 1/2015  | Budnik et al. .................. 714/27 |
| 9,183,122 | B2 | * | 11/2015 | Greer .................. G06F 11/3684 |
| 9,189,369 | B1 | * | 11/2015 | Giardina ............. G06F 11/3668 |
| 2003/0051163 | A1 | * | 3/2003 | Bidaud ......................... 713/201 |
| 2004/0250191 | A1 | * | 12/2004 | Learning ............... G06F 11/263 714/742 |
| 2005/0033977 | A1 | * | 2/2005 | Zurita ................. G06F 11/3688 726/26 |

(Continued)

*Primary Examiner* — Loan L. T. Truong
(74) *Attorney, Agent, or Firm* — The Law Office of Austin Bonderer, PC; Austin Bonderer

(57) ABSTRACT

A system for validating a hardware platform is provided. The system includes a database that stores one or more test specifications, a compiler that generates a target image based on (i) a device driver obtained from a device driver generator, (ii) a platform independent target application code, (iii) a kernel source, and (iv) a run time environment, and a software driven validation generator that analyzes the run time specification and the device programming specification and generates (i) one or more test cases based on (a) the one or more test specifications, and (b) the device programming specification, and (ii) a control software based on the test cases. The test cases include configurations that are specific to the hardware platform. The hardware platform is validated based on (i) an execution of the target image and the control software on the hardware platform, and (ii) the one or more test cases.

12 Claims, 15 Drawing Sheets

(56) References Cited

U.S. PATENT DOCUMENTS

| | | | |
|---|---|---|---|
| 2006/0161508 A1* | 7/2006 | Duffie et al. | 706/55 |
| 2006/0179363 A1* | 8/2006 | LaBanca | G06F 11/2257 714/57 |
| 2007/0234126 A1* | 10/2007 | Lu et al. | 714/38 |
| 2007/0250799 A1* | 10/2007 | Bunin | G06F 17/504 716/106 |
| 2008/0005798 A1* | 1/2008 | Ross | 726/26 |
| 2008/0115215 A1* | 5/2008 | Bardsley | 726/24 |
| 2008/0155572 A1* | 6/2008 | Kolathur | G06F 8/76 719/327 |
| 2009/0024886 A1* | 1/2009 | Arora | G01R 31/31813 714/720 |
| 2009/0164621 A1* | 6/2009 | Kothari et al. | 709/224 |
| 2009/0222694 A1* | 9/2009 | Adir et al. | 714/26 |
| 2010/0235813 A1* | 9/2010 | Manczak | G06F 8/71 717/121 |
| 2010/0251209 A1* | 9/2010 | Murthy | G06F 11/3684 717/104 |
| 2011/0113402 A1* | 5/2011 | Ciano | G06F 8/10 717/104 |
| 2011/0296197 A1* | 12/2011 | Konetski | G06F 21/53 713/189 |
| 2012/0029900 A1* | 2/2012 | Papariello | 703/21 |
| 2012/0253728 A1* | 10/2012 | Chamas | G06F 11/2294 702/109 |
| 2012/0265726 A1* | 10/2012 | Padmanabhan | G06F 17/303 707/602 |
| 2012/0323858 A1* | 12/2012 | Nagarkar et al. | 707/687 |
| 2013/0007730 A1* | 1/2013 | Hotra et al. | 718/1 |
| 2013/0139183 A1* | 5/2013 | Mallur | G06F 8/63 719/321 |

* cited by examiner

FIG. 5E

HARDWARE PLATFORM VALIDATION

BACKGROUND

1. Technical Field

The embodiments herein generally relate to validation of hardware platforms, and, more particularly, to system and method for hardware platform validation driven by software.

2. Description of the Related Art

Typically, in every electronic products components like one or more micro-controllers, memories (RAM, ROM, Flash), peripherals such as USB controller, Ethernet controller, WiFi and application specific processors, including DSP are present. A "Hardware platform" refers to a system that is composed of components like above, designed for a specific product application like a mobile communication device or a network router.

Most of the electronic devices/products will have number of hardware functionalities and at some point for development of a hardware platform. Softwares are integrated to determine performance and functionality of the device. The hardware platform can be a real board (e.g., mother board). The hardware platform may be realized as the physical hardware as found in an end product (product silicon), or a test sample of the sample platform (sample silicon) or an FPGA based implementation of the sample platform (Emulator) or a simulation of the platform at RTL or behavior levels like SystemC (simulator). Post-si platform can either refer to product silicon and sample silicon, and pre-si platform refers to either emulator or simulator.

The cost of a bug or defect to identify and fix it increases drastically if it is found in later stages like product silicon as against early stage like simulator. These defects should be found and fixed as early as possible and should be tested thoroughly at each stage. The overall objectives of platform level testing can be roughly divided into structural tests, functional validation and performance validation. Structural tests are performed to determine any connectivity issues. Functional validation tests are done to check whether hardware platform functions as per the requirements and performance validation tests are done to check whether the hardware platform service requests within stipulated time.

In the existing technology hardware platform is checked for structural issues, and the product software is then tested on the platform that means both hardware platform and softwares are tested jointly. Since both platform and software can potentially have bugs, defect isolation can be tedious. The product software requires many cycles to execute a specific validation goal and in pre-si especially in simulation, this means considerable simulation time is required for each test. There also custom test software available in which a testing engineer maintains the test software which is different from product software which is then used to test the hardware platform before testing both jointly. However, this custom test software is not portable on to different platforms and it is also not possible to check complete use-cases.

FIG. 1 is a line diagram illustrating validation of hardware platforms in a typical system on chip (SoC) lifecycle. There are validation Gap due to (i) No "software-in-loop" during validation, (ii) Not possible to check complete use-cases which implies, can't exercise hardware as the final product software would. With reference to FIG. 1, FIG. 2 is a graphical representation illustrating a typical scenario of bug population per phase. Number of bugs decrease from Pre-Si->Product. But the cost associated with isolation, debug and fix increases considerably. Cost of lost opportunities due to bugs in product can be even high (50% of chips need additional unplanned tapeouts).

Accordingly, there remains a need for developing a methodology and associated tool for enabling functional and performance validation of hardware platforms, and reproduce issues in post-si at pre-si stages efficiently, and effectively identify and isolate defects that otherwise manifest in product silicon, cost and schedule efficient.

SUMMARY

In view of the foregoing, an embodiment herein provides a system for validating a hardware platform. The hardware platform includes one or more hardware components, and one or more software components. The system includes a database that stores one or more test specifications, a device driver generator that receives a run time specification and a device programming specification that are specific to the hardware platform, and generates a device driver that is specific to the hardware platform, a compiler that generates a target image based on (i) the device driver, (ii) a platform independent target application code, (iii) a kernel source, and (iv) a run time environment, a software driven validation generator that analyses the run time specification and the device programming specification and generates (i) one or more test cases based on (a) the one or more test specifications, and (b) the device programming specification, and (ii) a control software based on the one or more test cases. The hardware platform is validated based on (i) an execution of the target image and the control software on the hardware platform, and (ii) the one or more test cases. The one or more test cases include one or more configurations that are specific to the hardware platform.

The system identifies the hardware platform when a control link is validated. A log message is displayed when a pair of probes is connected across at least one component of the hardware platform, wherein the log message indicates an execution status of the hardware platform. The one or more test cases are generated based on (i) a class of the hardware platform, and (ii) the one or more configurations. An input is processed from a user. The input includes a selection of at least one test case from the one or more test cases. The selection of the at least one test case is specific to the hardware platform. The at least one test case is executed to validate at least one hardware component or at least one software component of the hardware platform. The one or more test cases specify that the one or more software components are executed in software. The one or more software components that are executed in software are executed on the system.

In another aspect, a method of validating a hardware platform is provided. The hardware platform includes one or more hardware components and one or more software components. The method includes obtaining a device driver that is specific to the hardware platform, generating a target image based on (i) the device driver, (ii) a platform independent target application code, (iii) a kernel source, and (iv) a run time environment, analyzing, the run time specification and the device programming specification and generating (i) one or more test cases based on (a) the one or more test specifications, and (b) the device programming specification, and (ii) a control software based on the one or more test cases, and validating the hardware platform based on (i) an execution of the target image and the control software on the hardware platform, and (ii) the one or more test cases. The one or more test cases include one or more configurations that are specific to the hardware platform, The one or more test cases are generated based on (i) a class of the hardware platform, and (ii) the one or more configurations. The method may further include displaying the one or more test cases based on the analysis of the run time specification and the device programming specification, processing an input that includes a selection of at least one test case from the one or more test cases, and executing the at least one test case to validate the at least one hardware component or the at least one software component of the hardware platform. The selection of the at least one test case is specific to at least one hardware component or at least one software component of the hardware platform.

The method may further include connecting a pair of probes on a data line across the at least one hardware component of the hardware platform, and displaying a log message when the pair of probes is connected across at least one hardware component of the hardware platform. The log message indicates an execution status of the hardware platform.

In yet another aspect, a system for validating a hardware platform is provided. The hardware platform includes one or more hardware components, and one or more software components. The system includes a database that stores one or more test specifications, a compiler that generates a target image based on (i) a device driver obtained from a device driver generator, (ii) a platform independent target application code, (iii) a kernel source, and (iv) a run time environment, and a software driven validation generator that analyses the run time specification and the device programming specification and generates (i) one or more test cases based on (a) the one or more test specifications, and (b) the device programming specification, and (ii) a control software based on the one or more test cases. The one or more test cases include one or more configurations that are specific to the hardware platform. The hardware platform is validated based on (i) an execution of the target image and the control software on the hardware platform, and (ii) the one or more test cases.

The system identifies the hardware platform when a control link is validated. A log message may be displayed when a pair of probes is connected across at least one hardware component of the hardware platform. The log message indicates an execution status of the hardware platform. The one or more test cases specify that the one or more software components are executed in software. The one or more software components executed in software are executed on the system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5E illustrates a user interface view of displaying one or more pre-written tests for the components within the hardware platform of FIG. 4A according to an embodiment herein;

DETAILED DESCRIPTION OF PREFERRED EMBODIMENTS

Figure 1:
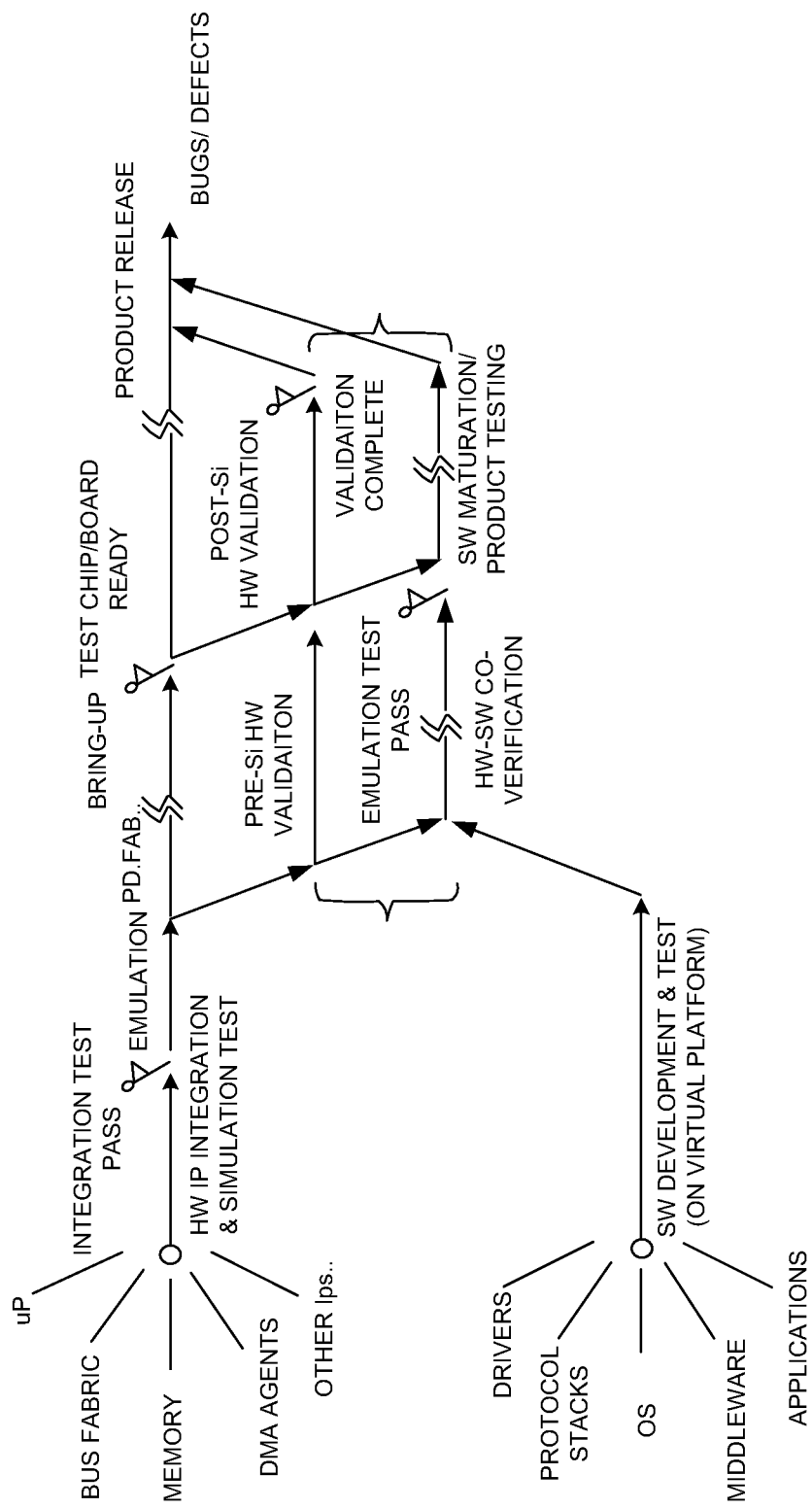
FIG. 1 is a line diagram illustrating validation of hardware platforms in a typical system on chip (SoC) lifecycle.
Figure 2:
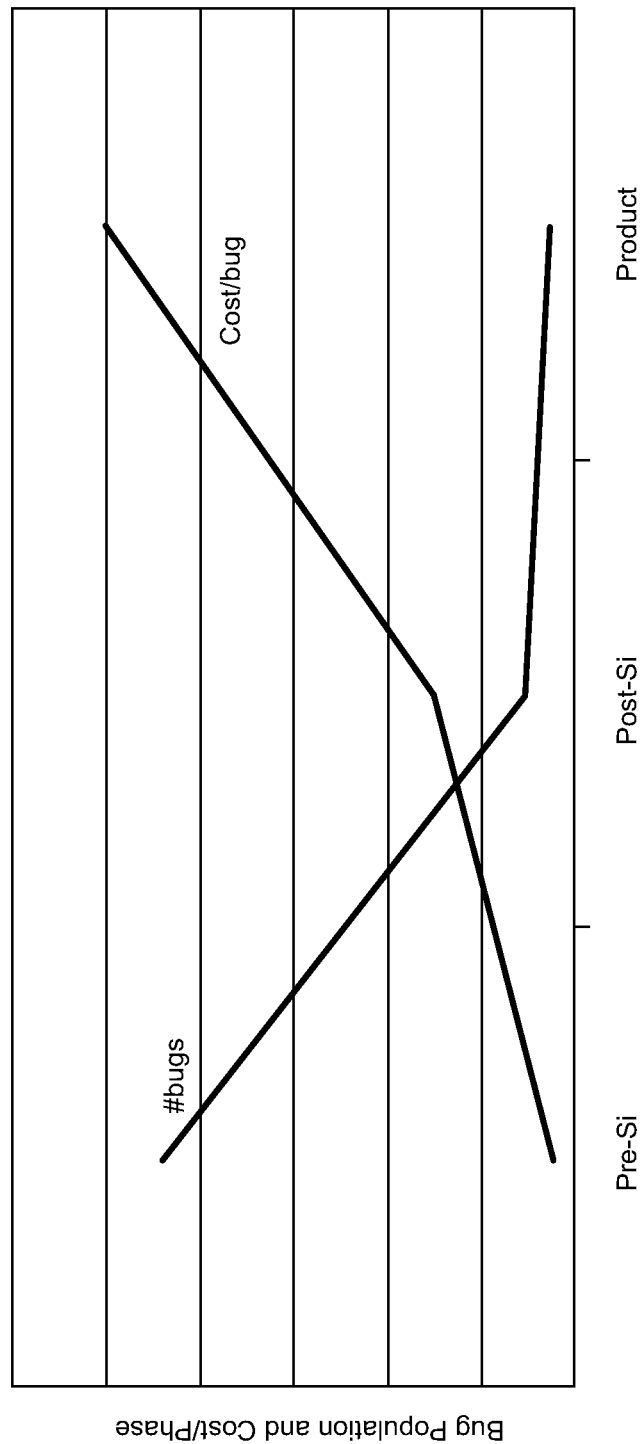
FIG. 2 is a graphical representation illustrating a typical scenario of bug population per phase.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for developing a methodology and associated tool for enabling functional and performance validation of hardware platforms, and reproduce issues in post-si at pre-si stages efficiently, and effectively identify and isolate defects that otherwise manifest in product silicon, cost and schedule efficient. The embodiments herein achieve this by providing a device programming specification (DPS) and run time specification (RTS) of the peripherals (e.g., one or more system components) on the hardware platform, customized device drivers generated from DPS and RTS using a device driver generator, customized Linux port for the hardware platform, platform independent target application code ("Validation middleware" and "command processor"), and a control software on a host system (e.g., a personal computer) that is used to control the board. Referring now to the drawings, and more particularly to FIGS. 3 through 10, where similar reference characters denote corresponding features consistently throughout the figures, there are shown preferred embodiments.

Figure 3:
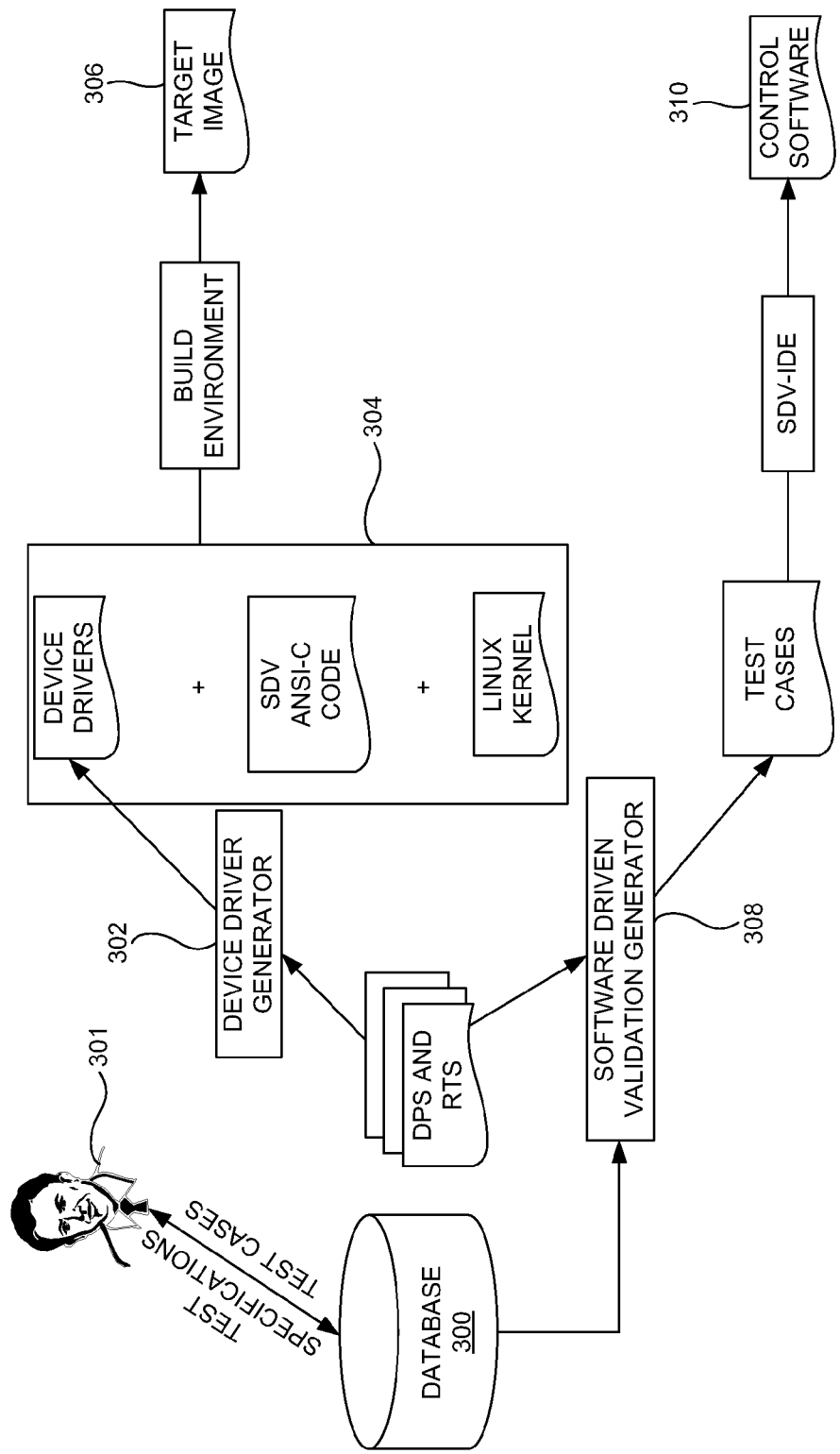
FIG. 3 is a block diagram illustrating generating a target image and a control software that are used for validating a hardware platform according to an embodiment herein.

FIG. 3 is a block diagram illustrating generating a target image 306 and a control software 310 that are used for validating a hardware platform according to an embodiment herein. The block diagram includes a database 300, a device driver generator 302, a compiler 304, the target image 306, and a software driven validation (SDV) generator 308, the control software 310. The hardware platform (not shown in FIG. 3) includes one or more hardware components, and/or one or more software components. The database 300 stores one or more test specifications. The one or more test specifications may be provided by a user 301, in one example embodiment. Additionally, one or more test cases may be provided by the user 301, in another example embodiment. The device driver generator 302 receives one or more inputs that includes a device programming specification (DPS) and a run time specification (RTS) and generates a customized device driver that is specific to the hardware platform. The DPS and the RTS may be obtained from the database 300, in one example embodiment. The DPS and the RTS may be provided by the user 301, in another example embodiment. The compiler 304 compiles the generated device driver with a platform independent target application code (e.g., ANSI C Code) and a kernel source along with an operating system build environment (e.g., Linux, VxWorks, Win CE, TI's DSP BIOS, iTRON, Null OS systems, etc.) to produce the target image 306. In one embodiment, the target image 106 is an executable file that is executed on the hardware platform. The hardware platform may be a USB, an Ethernet, a receiver such as TV set top box, a mobile communication device, and/or any other electronic/electrical circuit board, etc.

In one embodiment, device driver interface application programming interface (API) remains the same for all device classes (e.g., universal asynchronous receiver/transmitter (UART), Ethernet, USB, etc.). This API is based on the Linux character driver API. Each device driver generated can accept data ("sink(s)") or produce data ("source(s)"). "Sink" is achieved by write( ) function and "source" is achieved by the read( ) function of the character driver API. Each device driver can have multiple logical sources or sinks. Further each device driver will have a specified set of configuration parameters (as specified in the DPS).

The SDV generator 308 receives the DPS and RTS and generates the control software 310 (e.g., a host software) that is executed on a control processor within a host system (e.g., on a personal computer). The SDV generator 308 analyzes the DPS and the RTS and generates a) one or more test cases (e.g., one or more test scenarios) based on (i) the one or more test specifications, and (ii) the DPS, and b) a control software based on the test cases. The one or more test cases may be generated based a class of the hardware platform (e.g., UART, USB, etc.). The one or more test cases that are generated by the SDV generator 308 may be modified/edited by the user 301. Additionally, the one or more test specifications that are stored in the database 300 may be modified/edited by the user 301 as per the requirements to validate the hardware platform.

The hardware platform is validated based on (i) an execution of the target image and the control software on the hardware platform, and (ii) the one or more test cases.

Alternatively, the hardware platform 404 may be validated based on the one or more test cases and the one or more specifications provided and/or submitted by the user 301. The one or more test cases and the one or more specifications that are provided by the user 301 may be stored in the database 300. The one or more test cases and the one or more specifications provided by the user 301 may be termed as user submitted one or more test cases and/or user submitted one or more test specifications, in one example embodiment. The one or more test cases include one or more configurations that are specific to the hardware platform and/or various components of the hardware platform 404. In one embodiment, the SDV generator 108 analyses the DPS and the RTS (e.g., analyses the type of device, and corresponding features, registers in the device) and accordingly generates the test cases and the one or more configurations. The host system is connected to the hardware platform and the SDE-IDE is started on the host system. In one embodiment, IDE is a software tool where a user can specify additional tests and execute pre-generated tests.

Figure 4A:
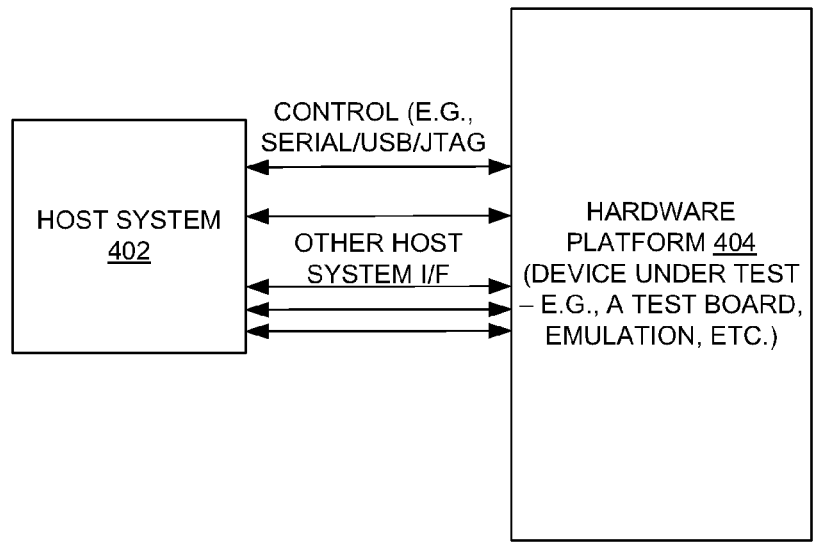
FIG. 4A illustrates a block diagram of a host system connected to a hardware platform according to an embodiment herein.

FIG. 4A illustrates a block diagram of a host system 402 connected to a hardware platform 404 according to an embodiment herein. In one embodiment, the host system 402 includes an operating system (e.g., a windows operating system or a Linux operating system). The host system 402 is connected to the hardware platform 404 that is tested and/or validating the hardware platform using at least one of a serial bus, a USB, or a Joint Test Action Group (JTAG), etc. The hardware platform 404 is a target device that is under test. The target device may be a test board, an emulation, etc. The target image 306 (e.g., the executable file) is executed on the hardware platform 404. The host system 402 includes the device driver generator 302, the compiler 304, and the software driven validation generator 308.

Figure 4B:
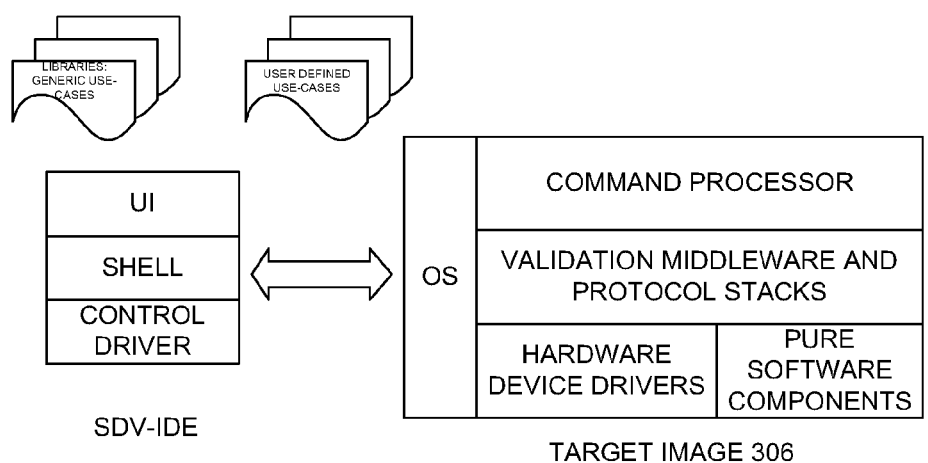
FIG. 4B illustrates a high level design of the host system and the hardware platform of FIG. 4A according to an according embodiment herein.

With reference to FIG. 3 and FIG. 4A, FIG. 4B illustrates a high level design of the host system 402 and the hardware platform 404 of FIG. 4A according to an according embodiment herein. The hardware platform (e.g., the target device) includes the target image 306 that has the hardware device drivers (generated from DPS/RTS) and software drivers. The validation middleware and protocol stacks are platform and/or the command processor independent. The validation middleware and protocol stacks setup required threads for execution and handling protocols like USB, Ethernet, etc. The command processor accepts control data from SDV-IDE, interprets them and calls appropriate services in the middleware.

The host system 402 includes a control driver (e.g., a device driver) for the physical link between the host system 402 and the hardware platform 404, a scripting environment (e.g., shell) and a graphical user interface (GUI). The host system includes one or more libraries (e.g., the one or more test cases, generic use cases, and user defined uses cases—pre-written tests (e.g., test scenarios that can be executed for one or more hardware platforms). In one embodiment, the device under test (e.g., the hardware platform 304) requires an operating system (OS), and includes the target image 306 that is platform and/or processor independent ANSI C Code.

The one or more test cases specify that the one or more software components are executed in software. The one or more test cases further specify how various components (e.g., the one or more hardware components and the one or more software components) interact with each other. The one or more software components are executed in software on the host system 402. The one or more test cases may be executed on (i) the host system 402, and (ii) the hardware platform 404. Alternatively, the one or more test cases may be (i) partially executed on the host system 402, and partially executed on the hardware platform 404. For example, a first stage of a test case may be executed on the host system 402, and a second stage of the same test case may be executed on the hardware platform 404.

Figure 5A:
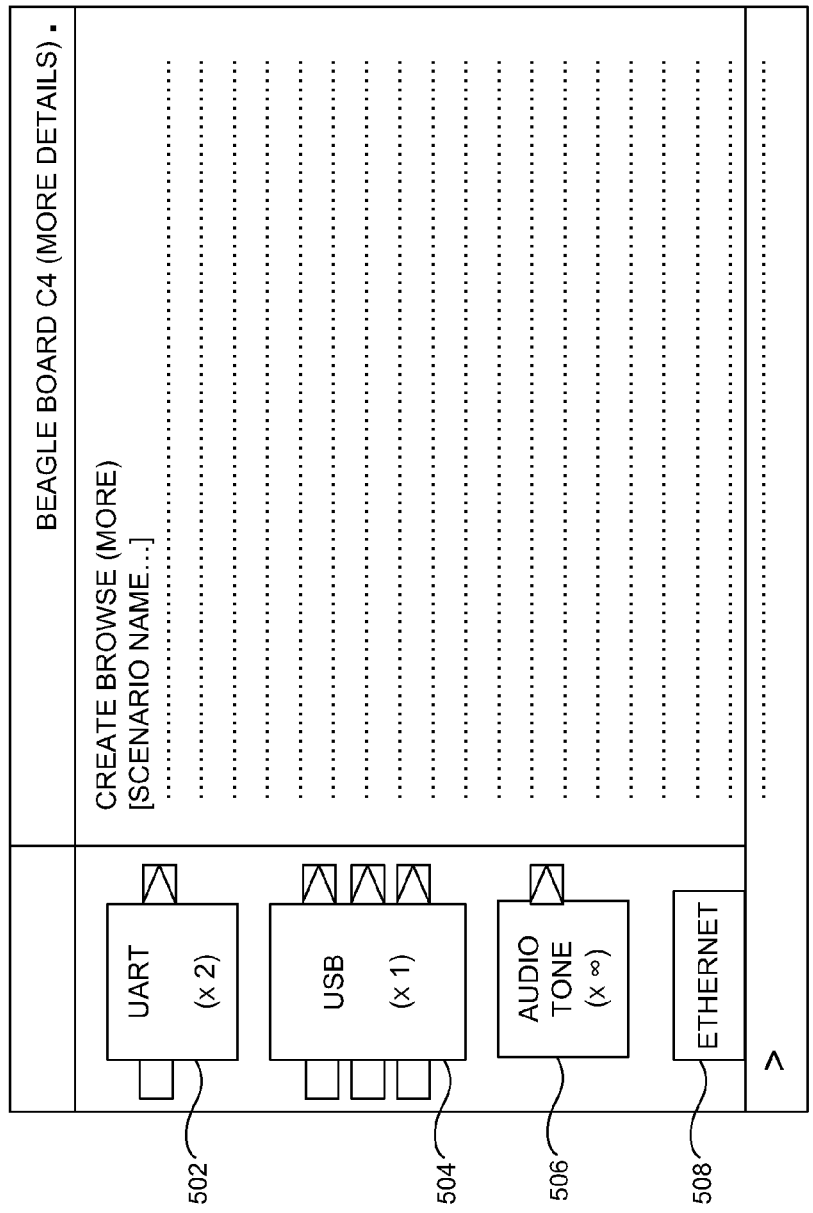
FIG. 5A illustrates a user interface view of a client application that resides on the host system for validating the hardware platform of FIG. 4A according to an embodiment herein.

FIG. 5A through FIG. 5F illustrates a user interface view of a client application that resides on the host system 402 for validating the hardware platform 404 of FIG. 4 according to an embodiment herein. FIG. 5A illustrates a user interface view of a client application that resides on the host system for validating the hardware platform 404 of FIG. 4A according to an embodiment herein. With reference to FIG. 5A, when the hardware platform (e.g., a test board) is connected to the host system 404, user selects a control link (not shown in FIG. 5A). The control link is validated, and the client application and/or the host system 402 identify the hardware platform and the components within the hardware platform. For example, as shown in FIG. 5A, the components may be a UART 502, a USB component 504, an audio tone component 506, an Ethernet component 508, etc. The one or more specifications may include by dragging and/or dropping the components (e.g., UART, USB, Ethernet, etc.) in the user interface view of the client application as shown in FIG. 5A. A basic unit of functionality implemented on the hardware platform 404 can provide an abstraction of a peripheral functionality such as UART, USB, Ethernet, or could be a pure software component as shown in FIG. 5A, or a pattern checker (PC), an audio tone generator (ATG), may have a generic source interface and/or a generic sink interface, may have configuration parameters (e.g., frequency in KHz for ATG), may be "instantiated" one or more times (e.g., with constraints in case of hardware dependent components. In one embodiment, when hardware platform 404 is identified, the host system 402 may retrieve one or more pre-written tests from its library and present it to the user to perform these tests for the hardware platform 404 that is connected to the host system 402.

Figure 5B:
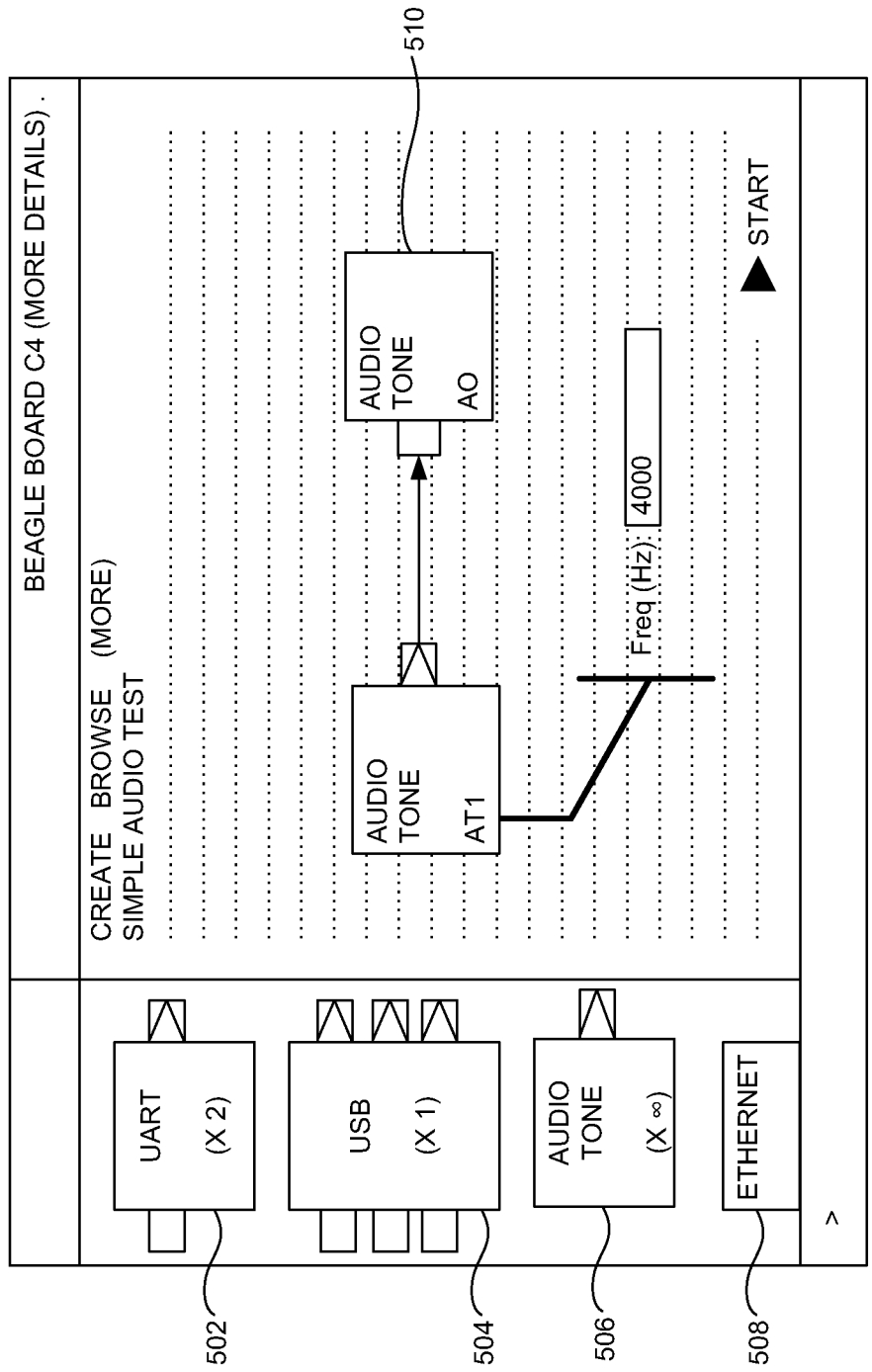
FIG. 5B illustrates a user interface view for validating one or more components of the hardware platform of FIG. 4A according an embodiment herein.

With reference to FIG. 5A, FIG. 5B illustrates a user interface view for validating one or more components of the hardware platform 404 of FIG. 4A according an embodiment herein. As shown in FIG. 5B, the components are instantiated, configured and connected to execute one or more various validating functions. In one embodiment, the audio tone component 506 is connected to an audio output component 510 for testing the audio functionalities of the hardware platform 404.

Figure 5C:
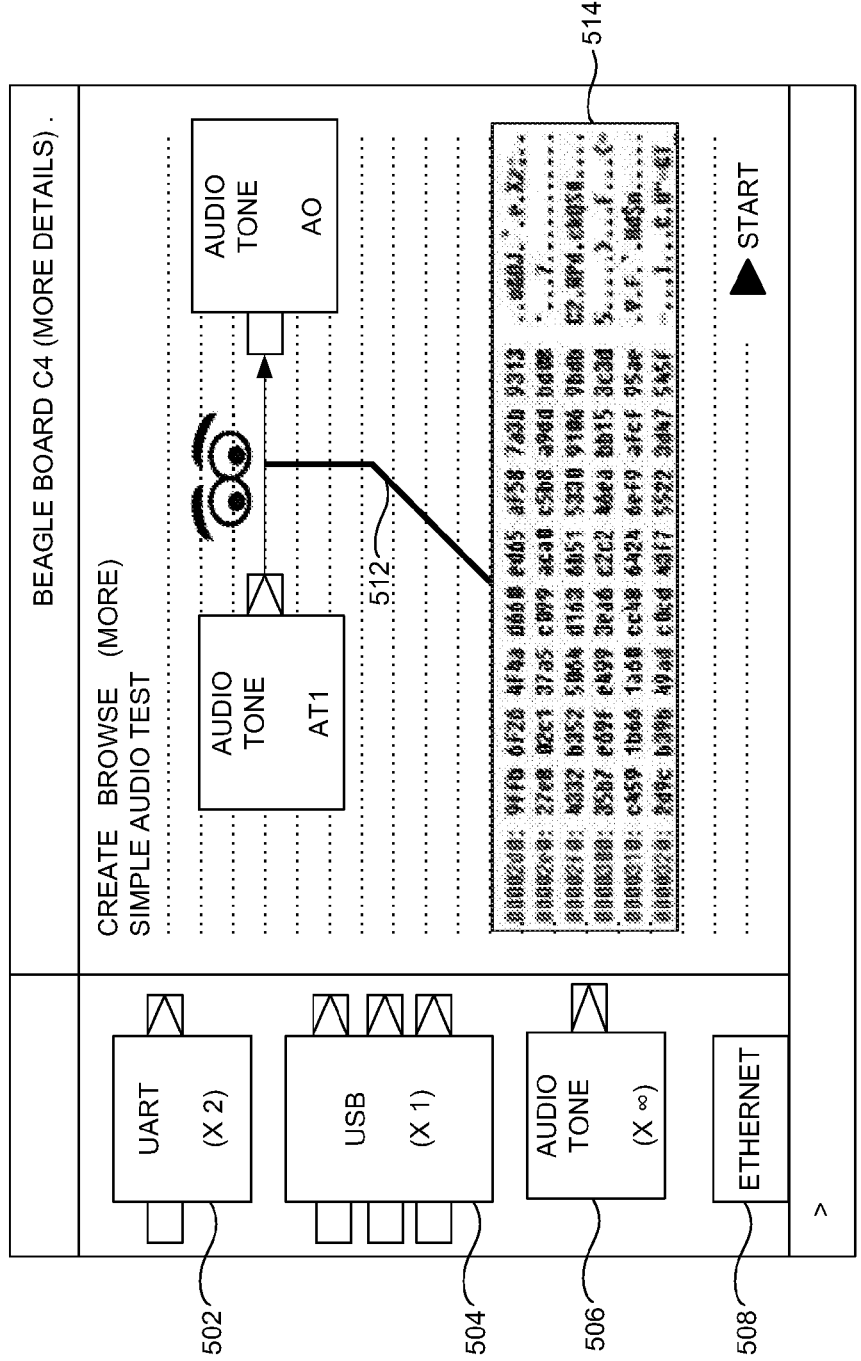
FIG. 5C is a user interface view illustrating a debug process of the audio tone component when connected to the audio output component using one or more probes according to an embodiment herein.

With reference to FIG. 5A and FIG. 5B, FIG. 5C is a user interface view illustrating a debug process of the audio tone component 506 when connected to the audio output component 510 using one or more probes 512 according to an embodiment herein. During the validation of the audio tone component 506, the user can attach probes on data paths between the audio tone component 506 and the audio output component 510 for debugging. Statistical data (e.g., or report) 514 for debugging the audio tone component 506 is shown in FIG. 5C.

Figure 5D:
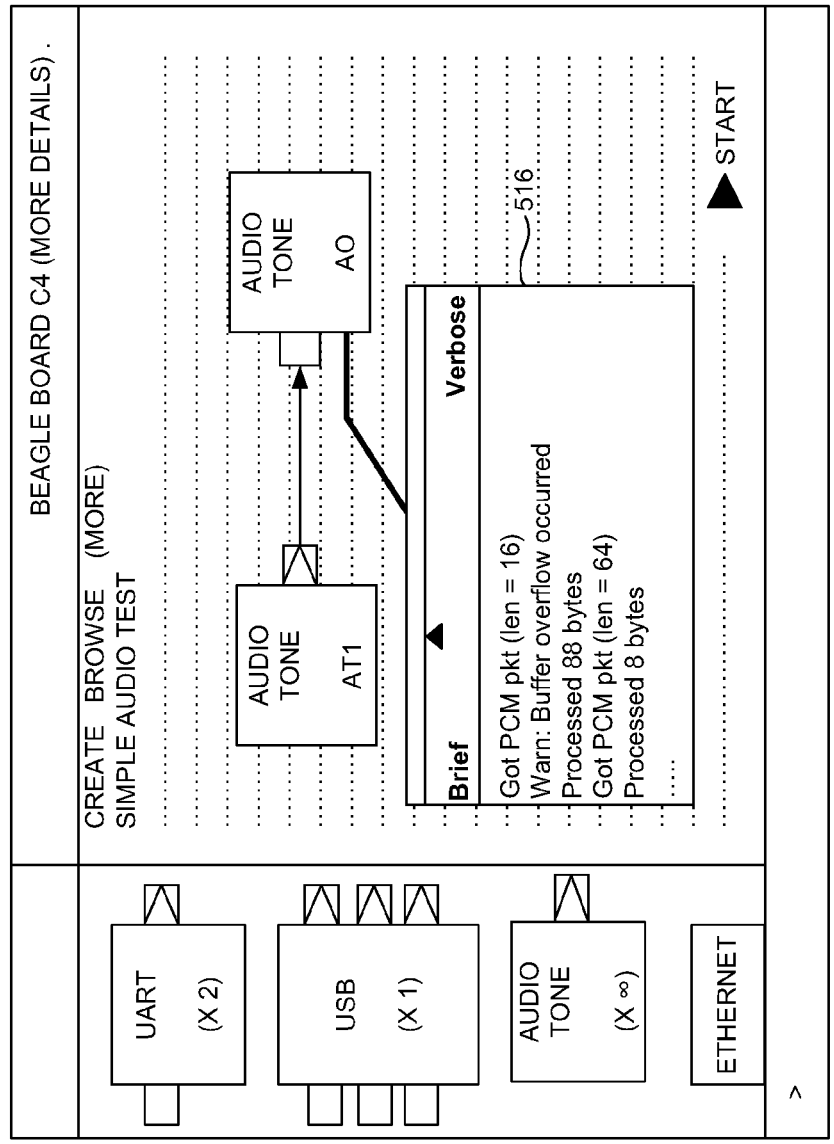
FIG. 5D is a user interface view illustrating a log message from one or more components of FIG. 5A according to an embodiment herein.
Figure 5E:
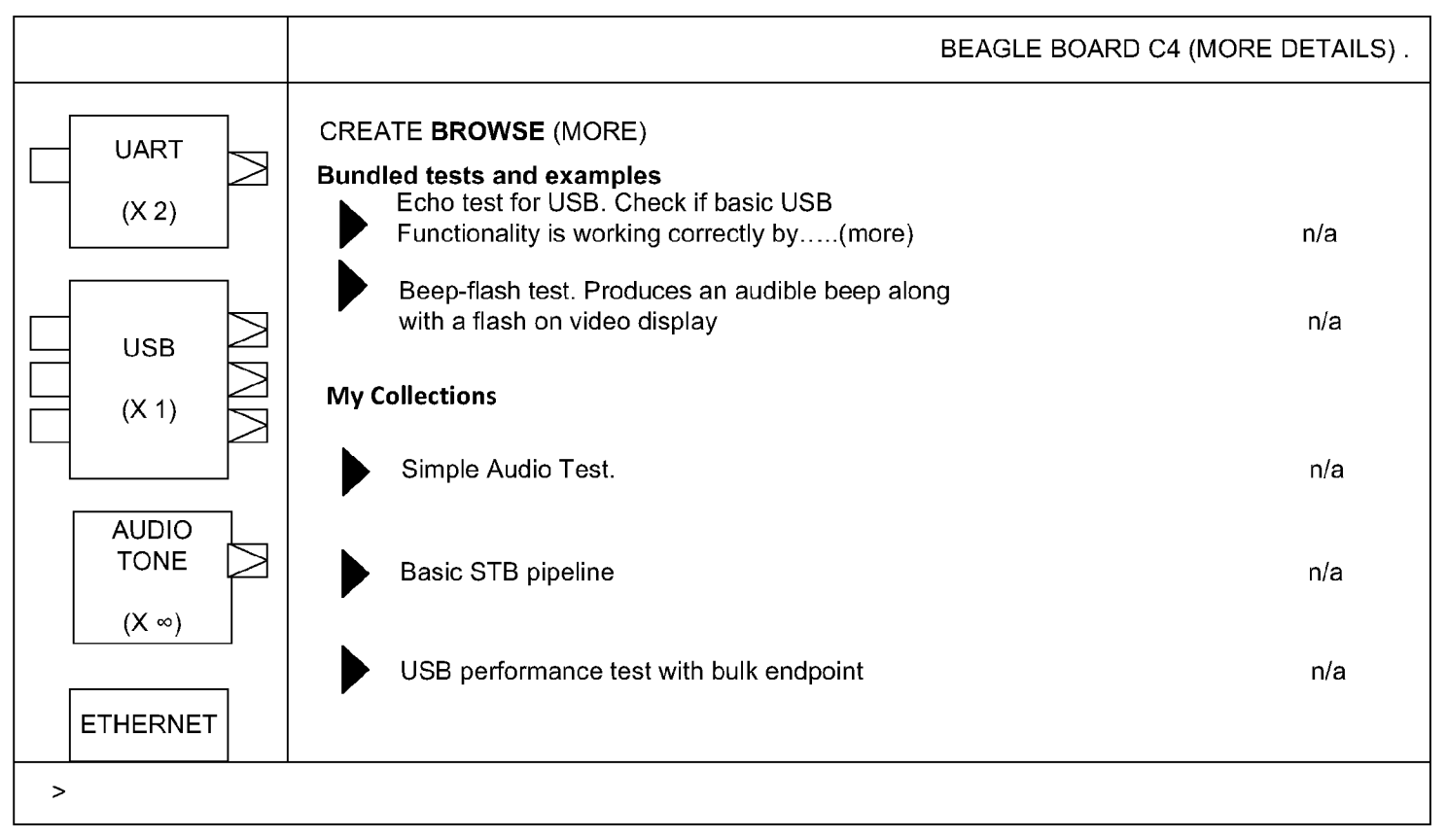
Figure 5F:
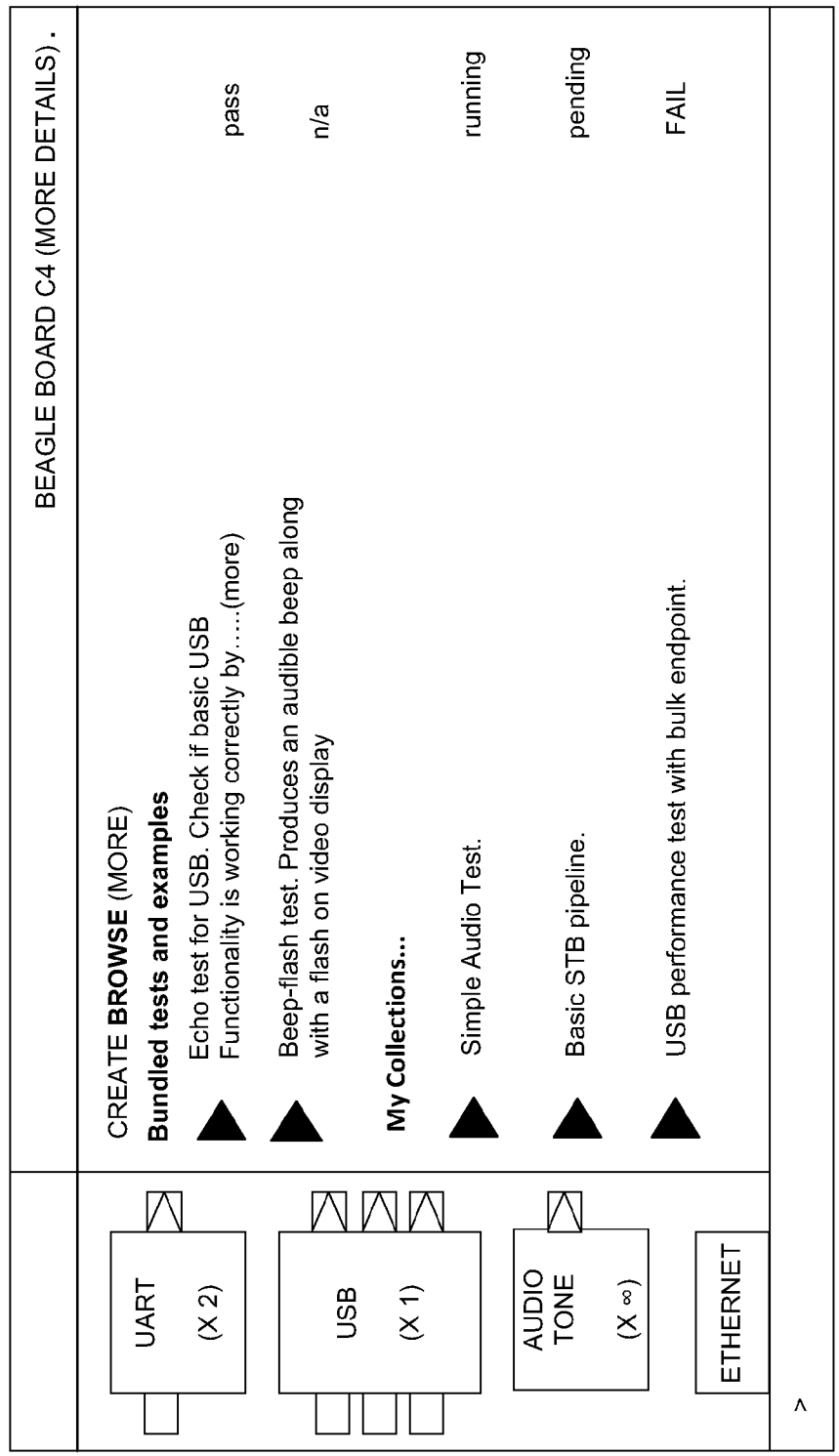
FIG. 5F illustrates a user interface view of running one or more pre-written tests for the components within the hardware platform of FIG. 4A according to an embodiment herein.

With reference to FIG. 5C, FIG. 5D is a user interface view illustrating a log message from one or more components of FIG. 5A according to an embodiment herein. The user can view one or more log messages by connecting probes to the components (e.g., the audio output component 510). A dialog box 516 is displayed to the user. The dialog box may include a log message as shown in FIG. 5D such as:

Got PCM pkt (len=16)
Warn: Buffer overflow occurred
Processed 88 bytes
Got PCM pkt (len=64)
Processed 8 bytes With reference to FIG. 5A through FIG. 5D, FIG. 5E illustrates a user interface view of displaying one or more pre-written tests for the components within the hardware platform 404 of FIG. 4A according to an embodiment herein. As shown in FIG. 5E, the pre-written tests are retrieved from one or more libraries, and are made available to the user to run these tests. In one embodiment, the user can browse the pre-written tests by clicking the browse option as shown in FIG. 5E. With reference to FIG. 5E, FIG. 5F illustrates a user interface view of running one or more pre-written tests for the components within the hardware platform 404 of FIG. 4A according to an embodiment herein. For example, the test may be an echo test for USB. This is checked if basic USB functionality is working correctly. If the USB functionality is working correctly, then the result is displayed as pass (which indicates that the USB component has passed this test).

Another test may be a beep-flash test. If the component produces an audible beep along with a flash on video display, then it is indicated that the component is working correctly. Other such tests may include simple audio test (e.g., status indicating running), basic STB pipeline (e.g., status indicating running), and/or USB performance test with bulk endpoint (e.g., status indicating FAIL). When the result is fail, the user can go back and see this log messages and insert probes to do trouble shooting. There may be some instances, in which the host system 402 may retrieve the one or more pre-written tests from the one or more libraries that may not be applicable in this context.

Figure 6:
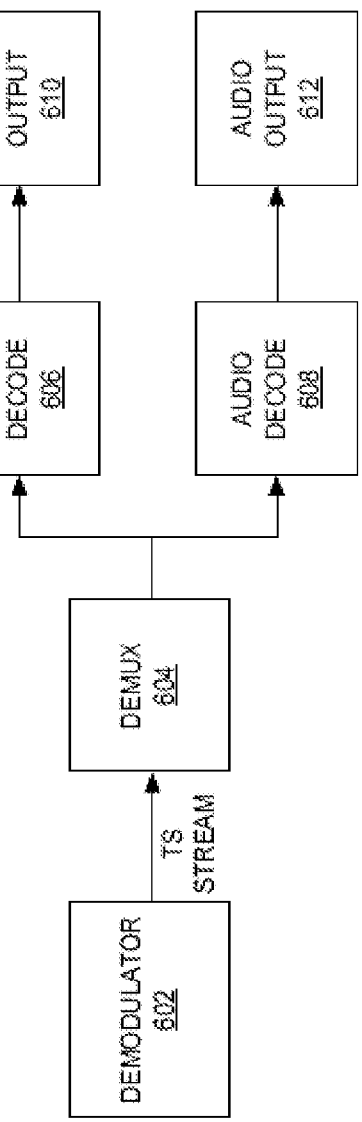
FIG. 6 illustrates a block diagram of a receiver according to an embodiment herein.

FIG. 6 illustrates a block diagram of a receiver according to an embodiment herein. In one embodiment, the receiver is a Television (TV) receiver (e.g., a set top box connected to a TV). The receiver includes a demodulator 602, a demux 604, a video decode block 606, an audio decode block 608, a video output block 610, an audio output block 612. As shown in FIG. 5A through FIG. 5F, the TV receiver (e.g., the hardware platform) may be validated for functionality and performance using the host system 402 by connected the hardware platform (e.g., the TV receiver) to the host system 402. Each of the components (e.g., the demodulator 602, the demux 604, the video decode block 606, the audio decode block 608, the video output block 610, the audio output block 612) have a device driver.

The one or more hardware components may be the demodulator 602, and/or the demux (de-multiplexer) 604, etc., in one example embodiment. The one or more software components may be the video decode block 606, and the audio decode block 608, etc., in another example embodiment. The video decode block 608 may decode using a hardware component on which the video decode block 608 is residing in/sitting on. Alternatively, the decoding may be done entirely in software. A data path is connection between the various components/hardware peripherals (e.g., an output of the demodulator 602 is sent to an input of the demux 604).

The input PID indicates configuration of the demux 604. In other words, the one or more configurations may include setting a PID for the demux 604. One or more configurations may be associated with only the one or more software components, in one example embodiment. The one or more configurations may be associated with only the one or more hardware components, in another example embodiment. The one or more configurations may be associated with both the one or more software components and the one or more hardware components, in yet another example embodiment. Thus, the one or more test cases is defined as and includes (i)

specifying how the various components interact with each other, (ii) one or more configurations of various components (e.g., setting the "Program ID" or "PID" for demux 604), (iii) a data-path that defines connection across the various components, (iv) various components can use hardware peripherals, (v) one or more software components/functionalities, and (vi) the one or more software components may be executing on the hardware platform 404 and/or on the host system 402 with reference to FIG. 4A.

FIG. 6 defines how the various functionalities on the hardware platform need to interact with each other. In other words, FIG. 6 illustrates a connected graph of functionalities as the basic means to perform hardware platform validation. The use of a graph in this manner is commonly known as "pipes and filters" design pattern. One of the well-known application of the "pipes and filters" is in Unix shell, where the output of one command can be piped to other: ls|grep−v "temp"|sort.

An example graph of such connected functionalities for a basic video pipe in a Set-top box or TV is shown in FIG. 6. When a hardware platform is connected to the host system 402, the host system 402 automatically infers possible use-scenarios (from analysis of DPS, together with a library of use-cases). By analyzing the DPS file, SDV-IDE can suggest possible use-scenarios. The components are configured and set to valid values automatically, and ensure consistency in configuration (from analysis of DPS). Device driver architecture is tailored for system level validation of the hardware platform. Further, software stack can be tailored for system level validation of the hardware platform.

Figure 7:
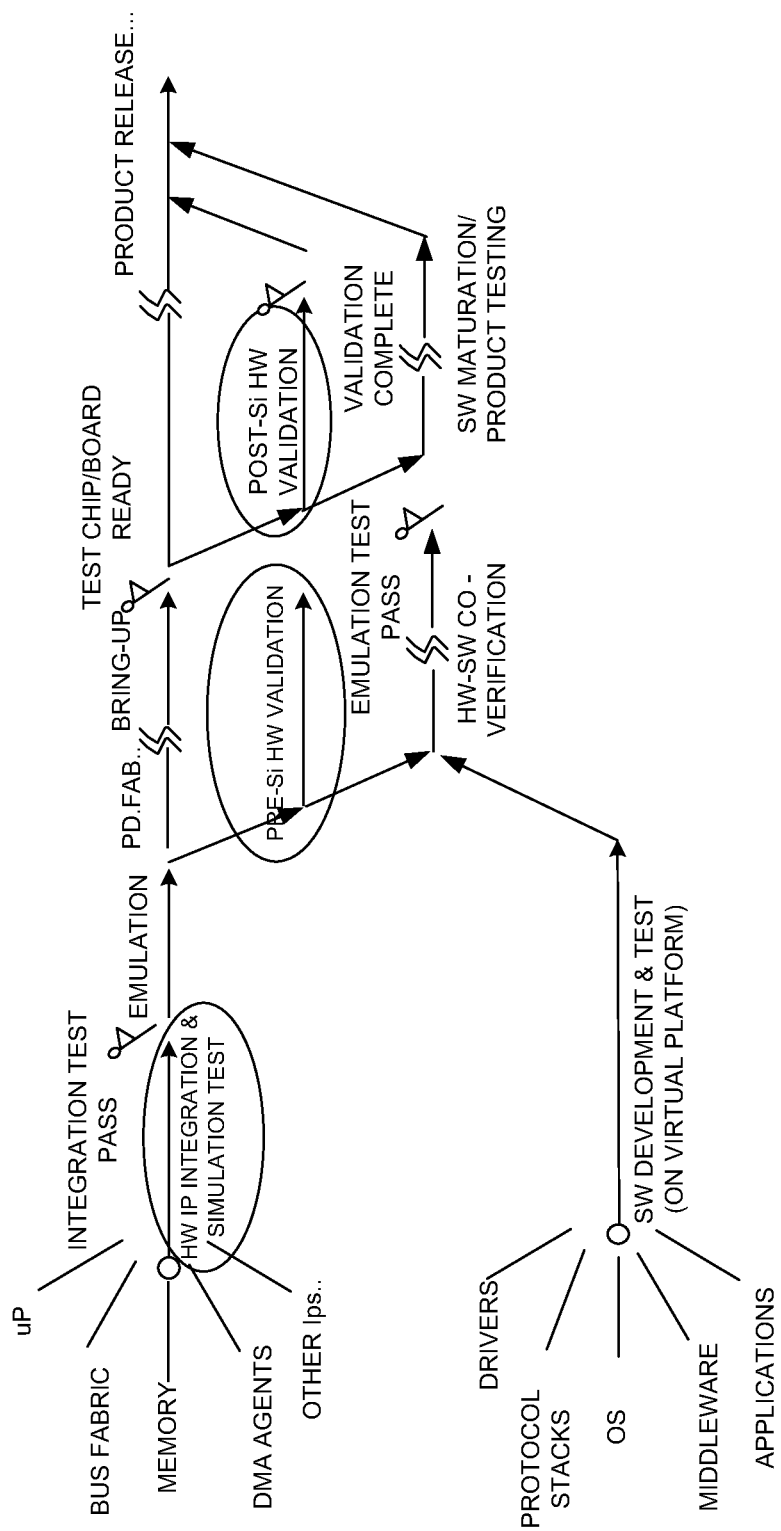
FIG. 7 is a line diagram illustrating software driven validation (SDV) of hardware platforms according to an embodiment herein.

FIG. 7 is a line diagram illustrating software driven validation (SDV) of hardware platforms according to an embodiment herein. This re-usable methodology that can be applied across: simulation: verification of system-level hardware platform, with a fast model of the processor, emulation: validation using accelerated emulation environment, and post-silicon: validation of test-board (e.g., the hardware platform).

Figure 8:
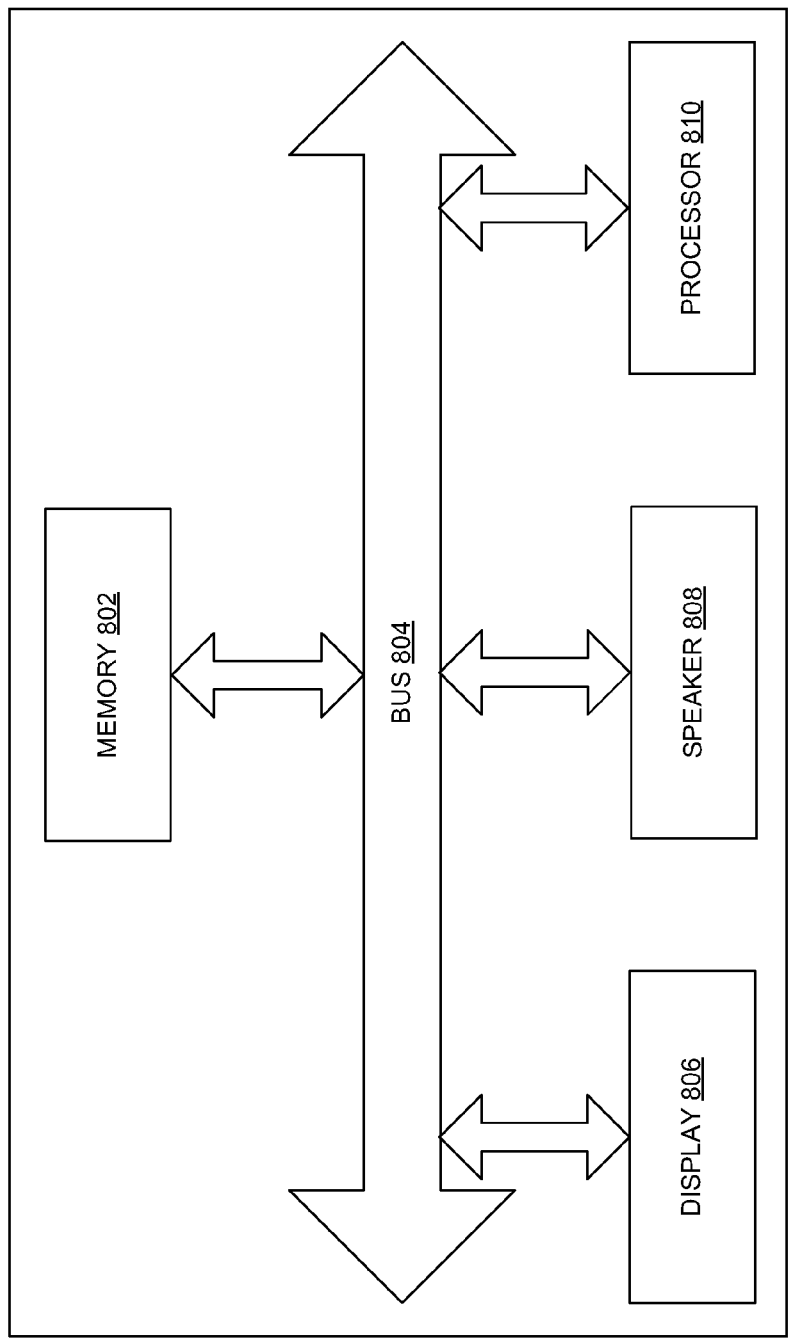
FIG. 8 illustrates an exploded view of the hardware platform having an a memory having a set of computer instructions, a bus, a display, a speaker, and a processor capable of processing a set of instructions to perform any one or more of the methodologies herein, according to an embodiment herein.

FIG. 8 illustrates an exploded view of the hardware platform having an a memory 802 having a set of computer instructions, a bus 804, a display 806, a speaker 808, and a processor 810 capable of processing a set of instructions to perform any one or more of the methodologies herein, according to an embodiment herein. The processor 810 may also enable digital content to be consumed in the form of video for output via one or more displays 806 or audio for output via speaker and/or earphones 808. The processor 810 may also carry out the methods described herein and in accordance with the embodiments herein.

Digital content may also be stored in the memory 802 for future processing or consumption. The memory 802 may also store program specific information and/or service information (PSI/SI), including information about digital content (e.g., the detected information bits) available in the future or stored from the past. A user may view this stored information on display 806 and select an item of for viewing, listening, or other uses via input, which may take the form of keypad, scroll, or other input device(s) or combinations thereof. When digital content is selected, the processor 810 may pass information. The content and PSI/SI may be passed among functions using the bus 804.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
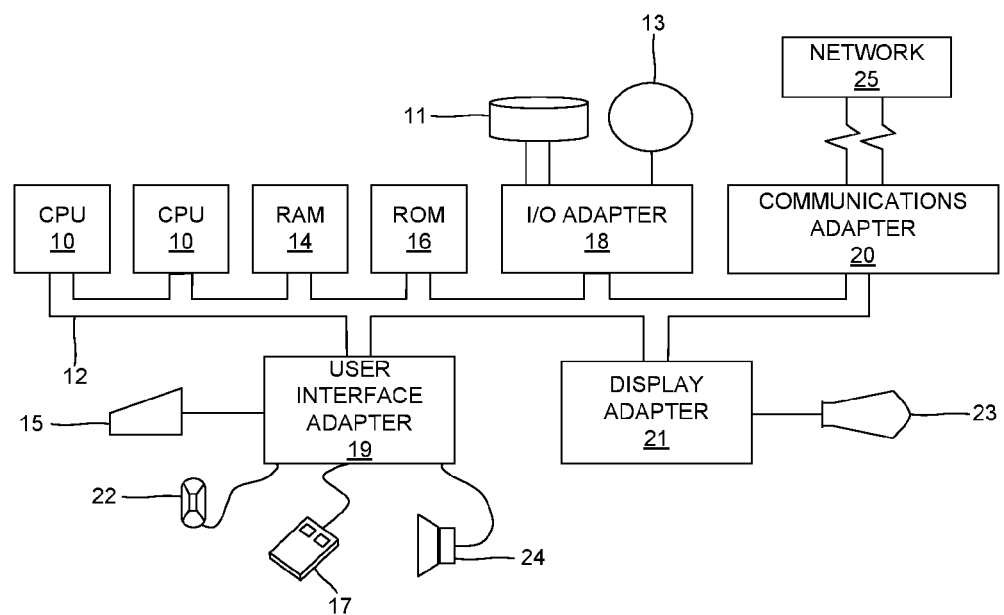
FIG. 9 illustrates a schematic diagram of a computer architecture used in accordance with the embodiment herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 10:
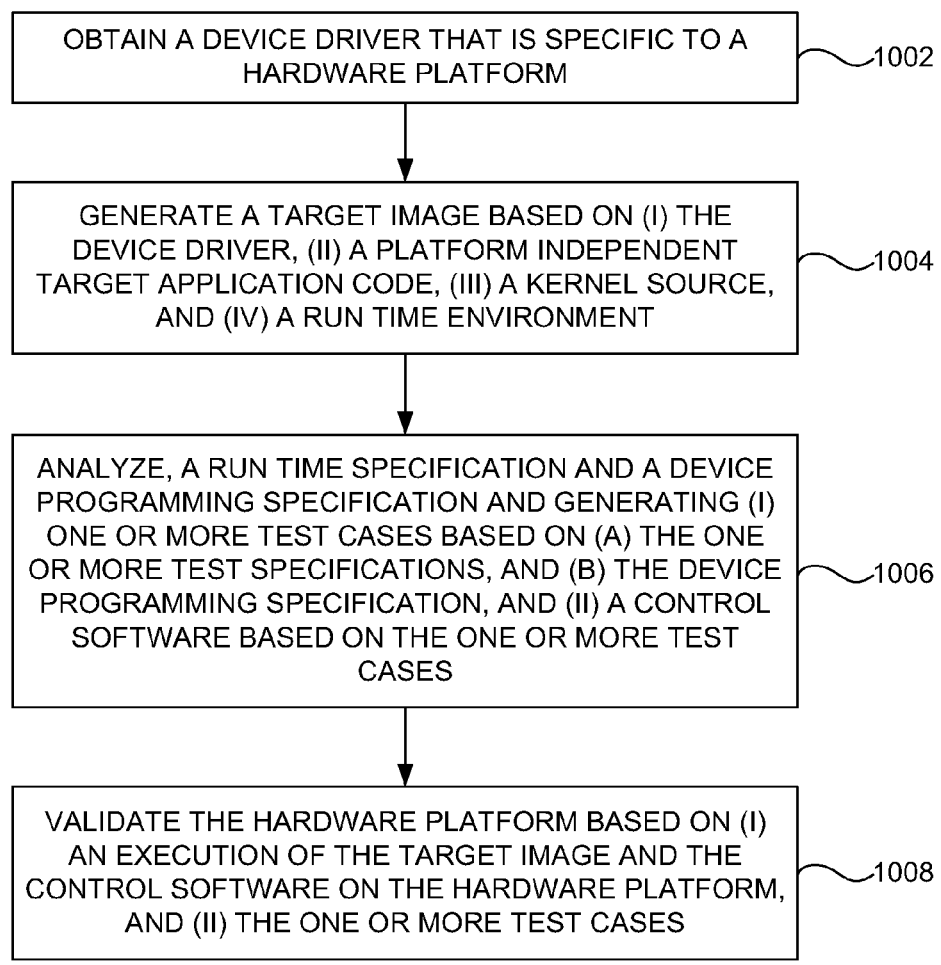
FIG. 10 is a flow diagram illustrating a method of validating the hardware platform of FIG. 1 according to an embodiment herein.

FIG. 10, with reference to FIGS. 1 to 9, is a flow diagram illustrating a method of validating the hardware platform 404 according to an embodiment herein. In step 1002, a device driver that is specific to the hardware platform 404 is obtained from the device driver generator 302. In step 1004, a target image (e.g., the target image 306) is generated based on (i) the device driver, (ii) a platform independent target application code, (iii) a kernel source, and (iv) a run time environment. The target image 306 is executed on the hardware platform 404. The compiler 304 generates the target image 306 by compiling (i) the device driver, (ii) the platform independent target application code, (iii) the kernel source, and (iv) the run time environment as shown in FIG. 3. In step 1006, the run time specification and the device programming specification are analyzed and (i) one or more test cases are generated by the software driven validation generator 308 based on (a) the one or more test specifications, and (b) the device programming specification, and (ii) a control software based on the one or more test cases. The one or more test cases include one or more configurations that are specific to the hardware platform 404. The one or more test cases are generated based on (i) a class of the hardware platform 404, and (ii) the one or more configurations. The one or more test cases are a data path across different hardware components and/or software components.

The one or more test cases may be displayed based on the analysis of the run time specification and the device programming specification. An input that includes a selection of at least one test case from the one or more test cases may be processed, and the at least one test case may be executed to validate the one or more hardware components and/or the one or more software components of the hardware platform 404. The selection of the at least one test case is specific to at least one hardware component and/or at least one software component of the hardware platform 404. The one or more test cases may also be specified by the user 301.

A pair of probes may be connected on a data line across the at least one hardware component of the hardware platform 404. A log message may be displayed (e.g., the log message as indicated in the description of FIG. 5D) as when the pair of probes is connected across at least one hardware component of the hardware platform 404. The log message indicates an execution status of the hardware platform 404. The one or more software components are executed in software. The one or more software components executed in software are executed on the host system 402 during an execution of the one or more test cases. The one or more software components may be executed on the hardware platform 404, in one example embodiment.

This hardware platform validation driven by software provides a very flexible architecture, allowing a validation engineer to quickly test many different scenarios, reproduce issues in post-Si at pre-Si stages efficiently. This hardware platform validation driven by software further allows perform staged validation of the hardware platform—start with simple unit level and move up to multiple functionalities that are interacting with each other. It further allows the user to use one or more debug probes, which when connected across components display log messages that enable the user to isolate the bug efficiently. Further, the communication between the host system 402 and the hardware platform 404 (including the one or more hardware components and/or the one or more software components) enables to (i) download the one or more test cases and/or the data path, (ii) parse one or more commands on the control link, (iii) report a status of the execution, and (iv) control other interfaces connected to the hardware platform (e.g., a USB/Ethernet, etc.) in a way that is consistent with one or more test cases when executed.

The execution of the one or more software components in software on the host system 402 during an execution of the one or more test cases (e.g., an online communication process between the host system 402 and the hardware platform 404) reduces the time consumption as compared to executing the one or more software components on the hardware platform 404. The one or more software components and the one or more hardware components may be combined and/or matched seamlessly in defining the one or more test cases. Alternatively, the one or more software components may be integrated/embedded into the one or more hardware components to define the one or more test cases.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for validating a hardware platform, wherein the hardware platform comprises one or more hardware components, and one or more software components, the system comprising:
 a database that stores one or more test specifications;
 a device driver generator that receives a run time specification and a device programming specification that are specific to the hardware platform, wherein the device driver generator generates a device driver that is specific to the hardware platform;
 a compiler that generates a target image based on (i) the device driver, (ii) a platform independent target application code, (iii) a kernel source, and (iv) a run time environment, wherein the target image is executed on the hardware platform;

a software driven validation generator that analyses the run time specification and the device programming specification and generates (i) one or more test cases based on (a) the one or more test specifications, and (b) the device programming specification, wherein the one or more test cases comprises one or more configurations that are specific to the hardware platform, and (ii) a control software based on the one or more test cases, wherein the hardware platform is validated based on (i) an execution of the target image and the control software on the hardware platform, and (ii) the one or more test cases.

2. The system of claim 1, wherein the system identifies the hardware platform when a control link is validated.

3. The system of claim 1, wherein the one or more test cases are generated based on (i) a class of the hardware platform, and (ii) the one or more configurations.

4. The system of claim 1, wherein an input is processed from a user, wherein the input comprises a selection of at least one test case from the one or more test cases, wherein the selection of the at least one test case is specific to the hardware platform, and wherein the at least one test case is executed to validate at least one hardware component or at least one software component of the hardware platform.

5. The system of claim 1, wherein the one or more test cases specify that the one or more software components are executed in software.

6. The system of claim 5, wherein the one or more software components executed in software are executed on the system.

7. A method of validating a hardware platform, wherein the hardware platform comprises one or more hardware components and one or more software components, the method comprising:

obtaining a device driver that is specific to the hardware platform;

generating a target image based on (i) the device driver, (ii) a platform independent target application code, (iii) a kernel source, and (iv) a run time environment, wherein the target image is executed on the hardware platform;

analyzing, the run time specification and the device programming specification and generating (i) one or more test cases based on (a) the one or more test specifications, and (b) the device programming specification, wherein the one or more test cases comprises one or more configurations that are specific to the hardware platform, and (ii) a control software based on the one or more test cases; and validating the hardware platform based on (i) an execution of the target image and the control software on the hardware platform, and (ii) the one or more test cases.

8. The method of claim 7, wherein the one or more test cases are generated based on (i) a class of the hardware platform, and (ii) the one or more configurations.

9. The method of claim 7, further comprising displaying the one or more test cases based on the analysis of the run time specification and the device programming specification;

processing an input comprising a selection of at least one test case from the one or more test cases, wherein the selection of the at least one test case is specific to at least one hardware component or at least one software component of the hardware platform; and executing the at least one test case to validate the at least one hardware component or the at least one software component of the hardware platform.

10. A system for validating a hardware platform, wherein the hardware platform comprises one or more hardware components, and one or more software components, the system comprising:

a database that stores one or more test specifications;

a compiler that generates a target image based on (i) a device driver obtained from a device driver generator, (ii) a platform independent target application code, (iii) a kernel source, and (iv) a run time environment; and a software driven validation generator that analyses the run time specification and the device programming specification and generates (i) one or more test cases based on (a) the one or more test specifications, and (b) the device programming specification, wherein the one or more test cases comprises one or more configurations that are specific to the hardware platform, and (ii) a control software based on the one or more test cases, wherein the hardware platform is validated based on (i) an execution of the target image and the control software on the hardware platform, and (ii) the one or more test cases.

11. The system of claim 10, wherein the system identifies the hardware platform when a control link is validated.

12. The system of claim 10, wherein the one or more test cases specify that the one or more software components are executed in software, and wherein the one or more software components executed in software are executed on the system.

* * * * *